Oct. 30, 1928.
J. H. BROOKMAN
1,689,773
LIFTING DEVICE FOR VEHICLE WHEELS
Filed April 9, 1927
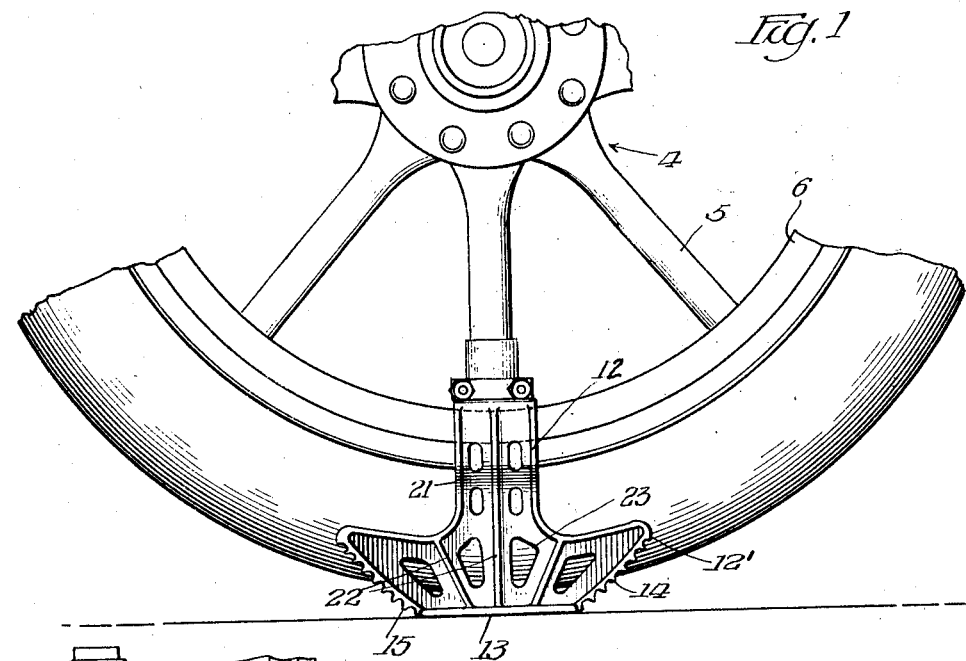
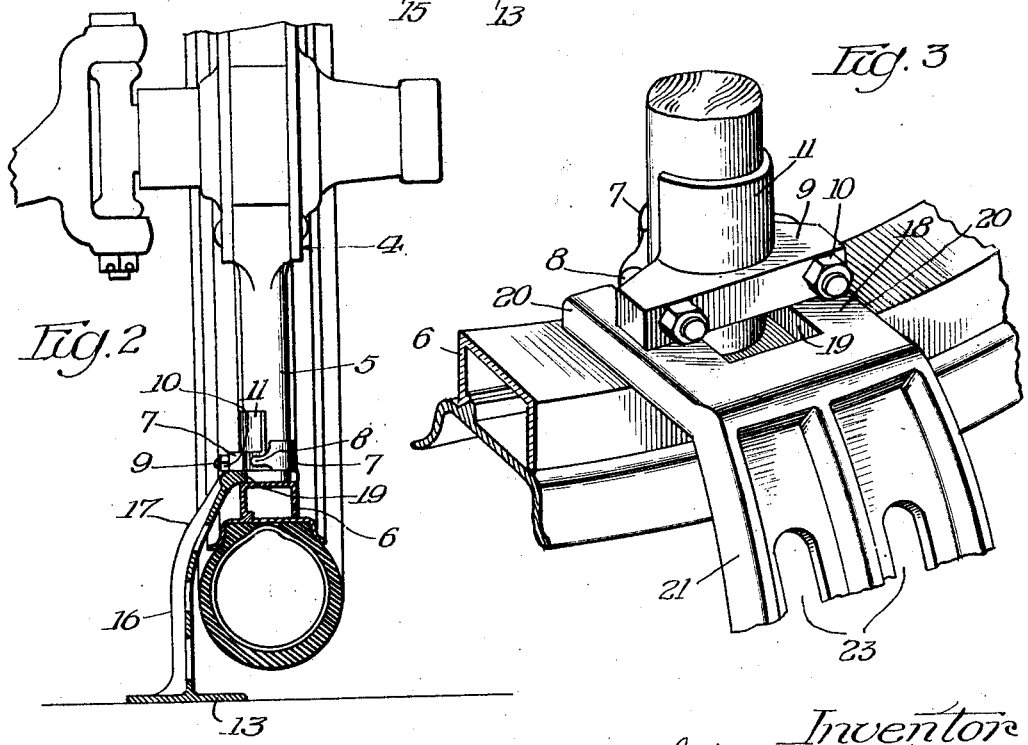
Inventor
John H. Brookman
By Wm O Bell Atty.

Patented Oct. 30, 1928.

1,689,773

UNITED STATES PATENT OFFICE.

JOHN H. BROOKMAN, OF CEDAR RAPIDS, IOWA.

LIFTING DEVICE FOR VEHICLE WHEELS.

Application filed April 9, 1927. Serial No. 182,308.

This invention relates to lifting devices for vehicle wheels of that type which are fastened to the wheel and are adapted to lift the wheel clear off the ground when the wheel has been turned to bring the device in relative position.

The object of the invention is to provide a strong and substantial lifting device of novel construction which can be easily and quickly applied to the wheel on the inside thereof to lift the wheel clear from the ground and permit the tire to be removed and replaced as required.

Another object of the invention is to provide a lifting device of simple construction which can be produced at low cost and which can be readily applied to a wheel without the exercise of special skill.

And a further object of the invention is to provide clamping means of simple construction adapted to be easily and permanently applied to a spoke of the wheel for receiving the body of the lifting device and holding it in proper position to perform its function.

In the accompanying drawings illustrating a selected embodiment of the invention:

Fig. 1 shows a portion of a pneumatic tired wheel with my invention applied thereto in lifting position.

Fig. 2 is a sectional view.

Fig. 3 is an enlarged perspective detail view, partly in section.

Referring to the drawings 4 is a vehicle wheel having spokes 5 connected to a felly 6 which, in this embodiment, is made of pressed steel, but which may be otherwise made if desired.

A clamp is applied to one of the spokes of the wheel, preferably to that spoke oppositely disposed to the valve stem, and ordinarily this clamp will be applied permanently to the spoke although it can be applied and removed whenever the lifting device is used, if desired. The clamp comprises a U bolt 7 having legs 8 which project through a transverse bar 9 and are threaded to receive the nuts 10 whereby the U bolt and bar are rigidly secured in proper position on the spoke and spaced from the felly. The U bolt and the bar are adapted to fit snugly upon the spoke and the bar has a semi-cylindrical extension 11 to provide an extended bearing for the bar upon the spoke. I prefer to arrange the U bolt 7 on the spoke at the outside of the wheel and the bar and its extension on the spoke at the inside of the wheel. These parts are comparatively small and compact and if they remain permanently in place on the spoke, they will not be conspicuous from the outside of the wheel.

Cooperating with the clamp is a body 12 which forms the main part of my lifting device. This body has side extensions 12' integrally connected thereto and a base 13 integrally connected to the body and the side extensions. The bottom edge of the side extensions are rounded or inclined as 14 to allow the wheel to easily ride up on the base. A series of corrugations 15 are arranged on the bottom or inclined edge of the side extensions to form a gripping surface for device.

The body proper has its lower end perpendicular to the base as at 16 and its upper end inclined outwardly as at 17 to properly space the lifting device from the vehicle tire.

Integrally connected to the upper end of the body and substantially at right angles thereto is a lug 18 or projection. This lug is slotted as at 19 to provide parallel legs 20. The slot is engaged by the spoke and the legs hold the body in relative position to the felly being clamped thereon and held in rigid position by the transverse bar 9.

A flange 21 is formed about the periphery of the body to add strength and rigidity thereto and webs 22 positioned at various places throughout the body connect the flange to the base and side extensions to further strengthen the body.

The body also has perforations 23 to decrease the weight of the device.

As the clamp is permanently fixed to a spoke it can be readily seen that the body is capable of being attached and removed very readily and without much effort or manual labor being required.

It may also be deemed preferable to attach one of the clamping members to a spoke on each of the wheels of the vehicle so that the body may be readily attached in case of emergency. It is not necessary to reach the axle particularly in connection with the rear wheels of the vehicle, in order to apply my improved lifting device as is necessary with jacks of the ordinary type. Furthermore the labor which is necessary to operate the ordinary jack is eliminated in the use of my improved lifting device, the power of the vehicle being employed to accomplish the lifting. It will be further understood that various changes may be made in the form, construction and arrangement of the parts without departing from the spirit and scope of the invention or sacrificing any of its material advantages, the form herein described being merely a preferred embodiment of my invention.

I claim:

1. A lifting device for vehicle wheels comprising a clamping device adapted to be attached to a wheel spoke and spaced from the wheel felly, a body having a slotted lug thereon for engaging said spoke, said lug being positioned between the bottom of the clamp and the felly to hold the body in relative position, extensions formed on said body and having the lower edges thereof inclined, corrugations formed on said edges to grip the pavement, and a flat base integrally formed on said body for supporting the vehicle when the wheel is brought to proper position.

2. A lifting device comprising a plate having a semi-cylindrical opening therein for engaging one side of a wheel spoke, a U bolt adapted to engage the opposite side of said spoke and having its legs extending through said plate, means for rigidly clamping said plate and said U bolt in fixed position on the spoke, said plate being spaced from the wheel felly, a body having a slotted lug integrally attached thereto for engaging said spoke and adapted to be held in position by said plate, engaging legs on said lug, side extensions formed on said body, said extensions having the lower edges thereof inclined to form a tractionable surface, corrugations arranged on said edges for gripping the pavement, and a flat base for supporting the vehicle when the wheel is brought to proper position.

3. A lifting device for vehicle wheels comprising a clamping device adapted to be attached to a wheel spoke and spaced from the wheel felly, a body having a slotted lug thereon for engaging said spoke, said lug being positioned between the bottom of the clamp and the felly to hold the body in relative position, extensions formed on said body and having the lower edges thereof inclined, corrugations formed on said edges to grip the pavement, and a flat base integrally formed on said body for supporting the vehicle when the wheel is brought to proper position, said body being provided with lateral webs to strengthen said body.

4. A lifting device for vehicle wheels comprising a clamping device adapted to be attached to a wheel spoke and spaced from the wheel felly, a body having a slotted lug thereon for engaging said spoke, said lug being positioned between the bottom of the clamp and the felly to hold the body in relative position, extensions formed on said body and having the lower edges thereof inclined, corrugations formed on said edges to grip the pavement, and a flat base integrally formed on said body for supporting the vehicle when the wheel is brought to proper position, said body having a peripheral flange to strengthen said body, webs connecting said flange and said base to further strengthen the body.

5. A lifting device for vehicle wheels comprising a clamping device adapted to be attached to a wheel spoke and spaced from the wheel felly, a body having a pair of legs thereon engaging said spoke, said legs being positioned between the bottom of the clamp and the felly to hold the body in relative position, extensions formed on said body and having the lower edges thereof inclined, corrugations formed on said edges to grip the pavement, and a base integrally formed on said body for supporting the vehicle when the wheel is brought to proper position, said body being provided with perforations to decrease the weight thereof.

6. A lifting device comprising a plate having a semi-cylindrical opening therein for engaging one side of a wheel spoke, a U bolt adapted to engage the opposite side of said spoke and having its legs extending through said plate, means for rigidly clamping said plate and said U bolt in fixed position on the spoke, said plate being spaced from the wheel felly, a body having a pair of parallel legs integrally attached thereto for engaging said spoke and adapted to be held in position by said plate, side extensions formed on said body, said extensions having the lower edges thereof inclined to form a tractionable surface, corrugations arranged on said edges for gripping the pavement, and a base for supporting the vehicle when the wheel is brought to proper position, said body being provided with lateral webs to strengthen said body.

7. A lifting device comprising a clamping device adapted to be attached to a wheel spoke and spaced from the wheel felly, a body having a slotted lug integrally attached thereto for engaging said spoke and adapted to be held in position by said plate, engaging legs on said lug, side extensions formed on said body, said extensions having the lower edges thereof inclined to form a tractionable surface, and a flat base for supporting the vehicle when the wheel is brought to proper position.

8. A clamping member for lifting devices comprising a plate having a semi-cylindrical opening therein for engaging one side of a wheel spoke, a U bolt adapted to engage the opposite side of said spoke and having its legs extending through said plate, and means for rigidly clamping said plate and said U bolt in fixed position on the spoke, said plate being spaced from the wheel felly.

JOHN H. BROOKMAN.